United States Patent [19]

Lang et al.

[11] Patent Number: 4,882,726
[45] Date of Patent: Nov. 21, 1989

[54] FULL DUPLEX MODEM SYSTEM FOR DIFFERING DATA BIT RATES

[75] Inventors: Gordon R. Lang, Bolton; Fred M. Longstaff, Islington, both of Canada

[73] Assignee: Motorola Canada Limited, North York, Canada

[21] Appl. No.: 123,941

[22] Filed: Nov. 23, 1987

[51] Int. Cl.$^4$ .................... H04B 1/56; H04B 1/50; H04J 3/22
[52] U.S. Cl. ........................ 370/24; 370/84; 375/8
[58] Field of Search .............. 370/24, 29, 30, 84, 370/75, 97; 375/8, 121

[56] References Cited

U.S. PATENT DOCUMENTS

| | | | |
|---|---|---|---|
| 3,775,751 | 11/1973 | Anderson | 370/84 |
| 4,069,392 | 1/1978 | Goldenberg et al. | 375/121 |
| 4,477,898 | 10/1984 | Cholat-Namy | 370/84 |
| 4,641,303 | 2/1987 | Vogi | 370/84 |
| 4,680,781 | 7/1987 | Amundson et al. | 375/8 |
| 4,700,358 | 10/1987 | Duncanson et al. | 375/8 |
| 4,734,920 | 3/1988 | Betts | 375/8 |

Primary Examiner—Benedict V. Safourek
Assistant Examiner—Wellington Chin

[57] ABSTRACT

A pair of full duplex modems are connected and each is designed to transmit to the other at the same predetermined band rates. One modem is connected to receive data bits for transmission over the channel at a predetermined first (and fast) rate and to transmit its received data bits at a integral number of first transmission bits per band. The other modem is connected to receive data bits for transmission over the channel at a rate slower than the band rate and is designed to sequentially encode blocks of said slower rate data bits into a larger number of second transmission bits for transmission over said channel at an integral number of second transmission bits per band. Means forming part of said one modem for converting said second transmission bits into the slower rate data bits.

18 Claims, 5 Drawing Sheets

FULL DUPLEX MODEM SYSTEM FOR DIFFERING DATA BIT RATES

This invention relates to a full duplex modem designed to transmit and receive at different data bit rates although at the same baud rate; and to coupled systems where both of the modems are so designed.

By 'full duplex modem' we mean a modem designed to receive and transmit simultaneously as distinguished from a modem with separate and/or alternating transmit and receive modes.

By 'data bit rate' we refer to the rate of supply of data bits to a modem for transmission over a channel to another modem, or the rate of transmission of data bits from a modem of data received from another modem.

By 'transmission bit rate' is meant the bit rate between two full duplex modems. In accord with the invention, the transmission bit rate from a modem may be different and higher than the data bit rate to or from that modem.

SUMMARY OF THE INVENTION

It is an object of the invention to provide a signalling system using a pair of full duplex modems connected by a channel where the modems communicate at a predetermined baud rate and a first modem provides transmission bits to the second modem at the rate of data bits supplied to the first modem and at an integral number of bits per baud but where the second modem receives data bits at a rate which is a fraction of the baud rate and wherein the second modem block encodes the data bits received into a larger number of transmission bits for transmission to the first modem at an integral number of bits per baud. The first modem is designed to decode the bits received over the channel into the original block encoded data bits.

It is an object of the invention to provide modems designed to operate as the first and second modems described in the previous paragraph.

It is an object of the invention to provide a modem described above as the 'second modem' wherein said block encoding of the fractional rate bits is in accord with coordinates determined by a row of a Hadamard matrix or its negative.

It is a preferred object of the invention to provide a modem for block encoding data bits (in accord with coordinates determined by a row of a Hadamard matrix or its negative) into transmission bits wherein the spectral qualities, for transmission, of the transmission bits, are improved by rotations of coordinates.

It is a preferred object of the invention to provide a modem for block encoding data bits in accord with a row of a Hadamard matrix or its negative into transmission bits wherein the coordinates are differentially encoded.

A principal use for the invention will have a pair of full duplex modems, each transmitting and receiving at the same baud rate, for example 2400 baud. One modem is connected to a slow data bit supply such as a small computer which supplies data to its associated modem at a data bit rate of for example 300 bits/second (bps). The other modem is connected to a fast data bit supply such as a large commputer. In the modem connected to the large computer its data bit rate and transmission bit rate to the channel will be the same, for example 4800 or 9600 bps that is 2 or 4 bits per baud. In the modem connected to the small computer the data bit rate of, for example, 300 bps, the transmission bit rate onto the channel from the modem will be 4800 bps while the data bit rate to the modem will be 300 bps and the transmission bit rate from the modem will be 4800 bps or two bits per baud.

The invention therefore provides means at the transmitting modem for the slow data bit supply for block encoding bits of the slow data bit supply into a larger number of transmission bits carrying the same information and designed to be sent at the predetermined common baud rate for the two modems. Thus the transmission bits from the modem with the slow data bits supply may be thought of as carrying a fractional number of data bits per baud. At the modem receiving the small data bit rate, the ratio of the number of transmission bits to the number of data bits from which the transmission bits have already been encoded corresponds to the ratio of transmission bit rate from the modem to the data bit rate supplied to the same modem.

Use of the predetermined baud rate by the modem transmitting the data with the slow data rate supply makes efficient use of the channel band width and allows in the encoding of blocks of the slow data bits, into a larger number of transmission bits, the distribution of the information in the block encoded bits over a larger number of transmission bits by the use of suitable encoding techniques. Such distribution and techniques provide a coding gain of between 18 and 20 db over present coding methods for the transmission of slow bit rate data which may be used to reduce echo cancelling requirements or transmission levels or both.

Reduction of echo cancelling requirements in turn reduces the computational resources which need be supplied to cancellation of this echo. Reduction in transmission levels results in savings in power and equipment design.

Encoding and detection have been determined to be simple and inexpensive.

If desired, different transmit levels, can be selected for the two modems so that the computational requirement is equalized at each modem, and for efficient use of or equalization of computational requirements.

For use in a system involving connected duplex modem there will here now be described preferred duplex modems and operating procedure. The preferred modems are connected by a channel (which may be of any conventional type) where the paired modems communicate at 2400 bauds. The first modem receives data bits from a large computer or other relatively high speed data supply at 4800 or 9600 bps, so that signalling from the first modem takes place at 2 or 4 bits per baud. With the first modem it will be noted that the data bit rate from the computer to the first modem is the same as the transmission bit rate from the first to the second modem and encoding and decoding at the first and second modems may be performed by conventional means, and methods.

The second modem in the preferred arrangement receives data bits from a small computer or other relatively low speed data supply at 300 bps. Encoding means at the second modem converts these bits in blocks of eight into 128 transmission bits based on one of 256 sets of 128 coordinates. The rate of transmission bits is $300 \times 128/8$ or 4800 bps or 2 bits per baud from the second to the first modem. The distribution of the information from 8 data bits over 128 transmission bits allows use of code which provides 20 db gain. Encoding for each of the 8 bits, treated as a number N, is in accord with one or the rows of a $128 \times 128$ Hadamard matrix or its negative. In the preferred embodiment, encoding also includes rotations of the Hadamard coordinates to provide better spectral characteristics to the 128 coordinates for transmission and differential encoding to limit errors during transmission.

Decoding is the inverse of encoding. In the preferred embodiment the spectral adjustment carried out in encoding must first be reversed. Then the received coordinates are rotated using the Hadamard matrix as a rotation matrix so that the message points lie on the axis. For convenience the scale is also shrunk during the rotation. This is done by means of a "fast Hadamard transform". Rotation so that the message points lie on the axis is to some extent analogous to converting in two dimensions the four coordinates $\pm 1$, $\pm 1$ into one of the four coordinates $\pm\sqrt{2}$, 0, or 0,$\pm\sqrt{2}$ where the four bits of information are identified by the location and sense of the non-zero coordinate. (If shrinkage were also involved the four coordinates would become $\pm 1,0$ or $0,\pm 1$.) By analogy, the decoding rotation in the preferred embodiment produces a coordinate whose place in the 128 time slots provides 7 bits and whose sense provides the 8th bit of the block encoded eight bits of data.

BRIEF DESCRIPTION OF THE DRAWINGS

In drawings which illustrate a preferred embodiment of the invention.

DESCRIPTION OF THE PREFERRED EMBODIMENT

Figure 1:
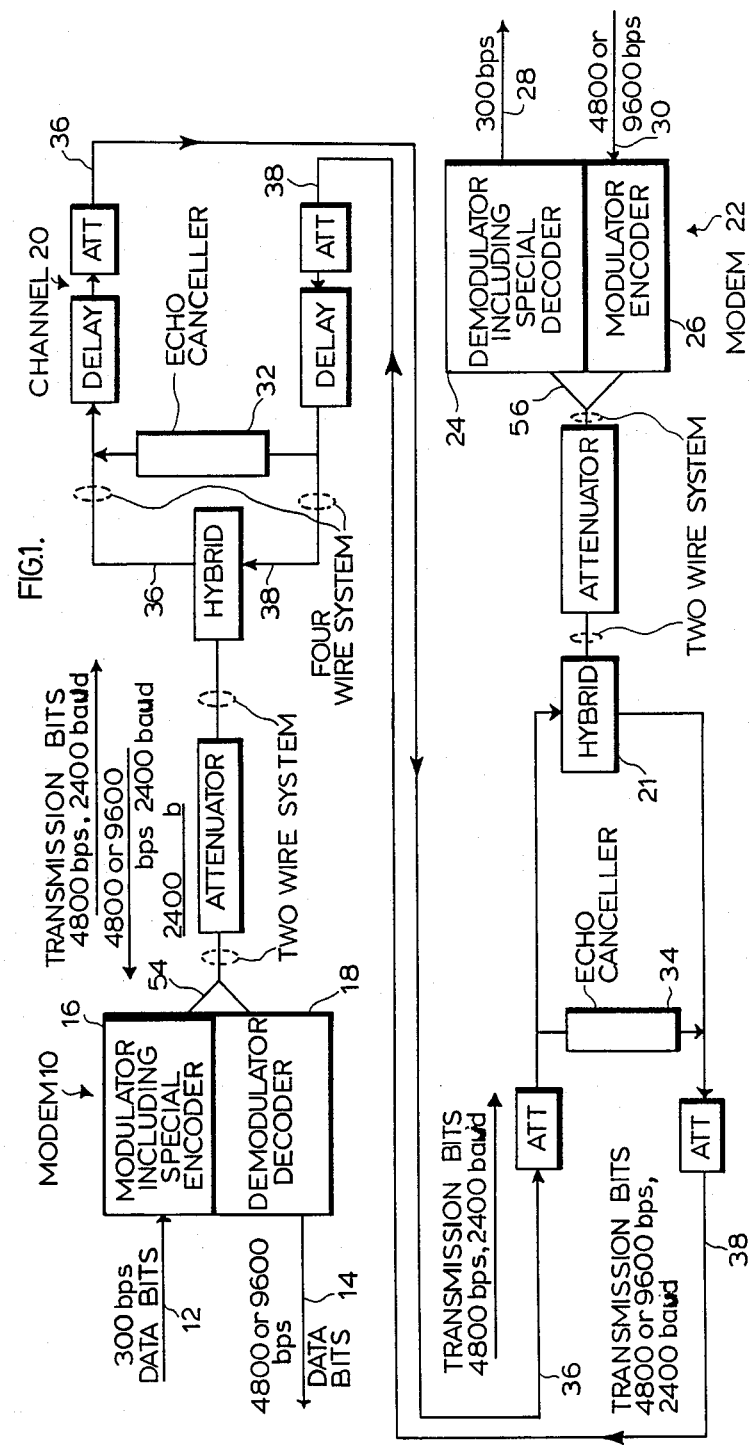
FIG. 1 is a schematic illustration of a system using two full duplex modems.

In FIG. 1 modem 10 is associated with a small computer or slow data supply (not shown) which provides to the modulator 16, portion of the modem along data bits on line 12 at 300 bps and which receives from the demodulator 18 portion of modulator 10 data bits at 4800 or 9600 bps. The modem 10 is connected over channel 20, to be briefly described hereafter, to modem 22, where incoming signals are specially decoded at demodulator 24 to be hereinafter described and supplied as data bits to a large computer or other destination at 300 bps. Modem 22 receives in its modulator 26 portion data bits from a large computer or other fast data supply as 4800 or 9600 bps for transmission on the channel.

Modulator 26 and demodulator 18 may be conventionally designed. Modulator 16 and demodulator 24 are specially designed in accord with the invention to; encode 8 data bits into 128 tansmission bits, and decode 128 transmission bits into 8 data bits, respectively.

Modulator 26 and demodulator 18 may be of conventional design. It is understood that modems 10 and 22 are designed to signal both ways at 2400 baud. It will also be noted that such a baud rate makes efficient use of the telephone channel. The channel, as shown, between modem 10 and modem 20 may be a completely conventional arrangement and comprises a two and four wire system, hybrids, delays, attenuators (sometimes in the drawings abbreviated to 'ATT.') and echo cancellers. Since this is only a schematic representation of a conventional arrangement it will be realized that any suitable channel design may be used and that suitable components and arrangements will be used in addition to, or in substitution for, echo cancellers 32 and 34 shown. Other echo cancellers than those shown may be used and in other locations. However, it should be noted that echo canceller 34 is located in FIG. 1 would be primarily used to cancel on line 38 the echo of the transmission bits sent along line 36. Since a 20 dB saving may be achieved due to the use of the specially encoded transmission bits from modulator 16, this may be used to reduce the cancellation requirements to canceller 34 although the 20 dB savings may be realized in other ways.

Figure 2:
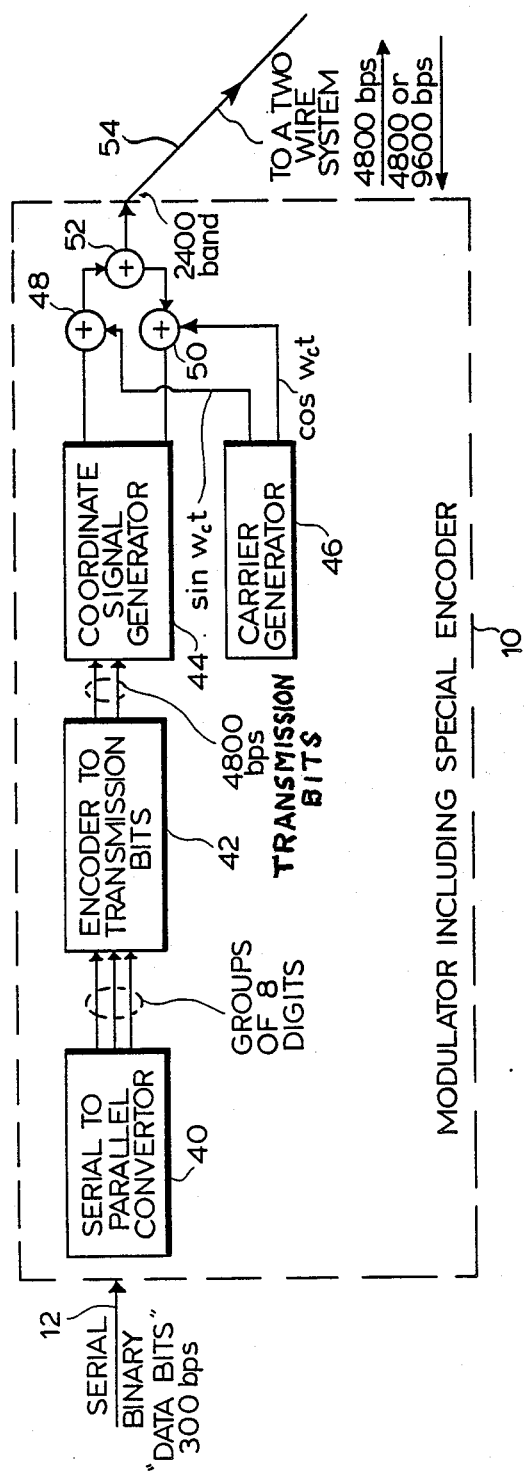
FIG. 2 is a schematic of the modulator with encoding means to distribute blocks 8 data bits over 128 transmission bits.

In FIG. 1 line 54 is shown in the connection from modulator 16 to the attenuator 55 and channel and line 54 is indicated to locate the same connection in FIG. 2.

In FIG. 2 the modulator 16, including special encoder 42 is shown schematically. Data bits are serially supplied along line 12 to serial to parallel convertor 40 where eight bit blocks are converted to parallel arrangement. It will be noted that this introduces an eight bit delay into the data transmission. The parallel bits from convertor 40 are encoded to 'transmission bits' at encoder 42 (as hereinafter described in detail) and provided as transmission bits to the coordinate signal generator 44 as transmission bits at 4800 bps. The coordinate signal generator 44 has both a sine and a cosine output for quadrature modulation with the output of a carrier generator 46 at multipliers 48 and 50 whose outputs are added at 52 and supplied to line 54 of the two wire system.

Figure 4:
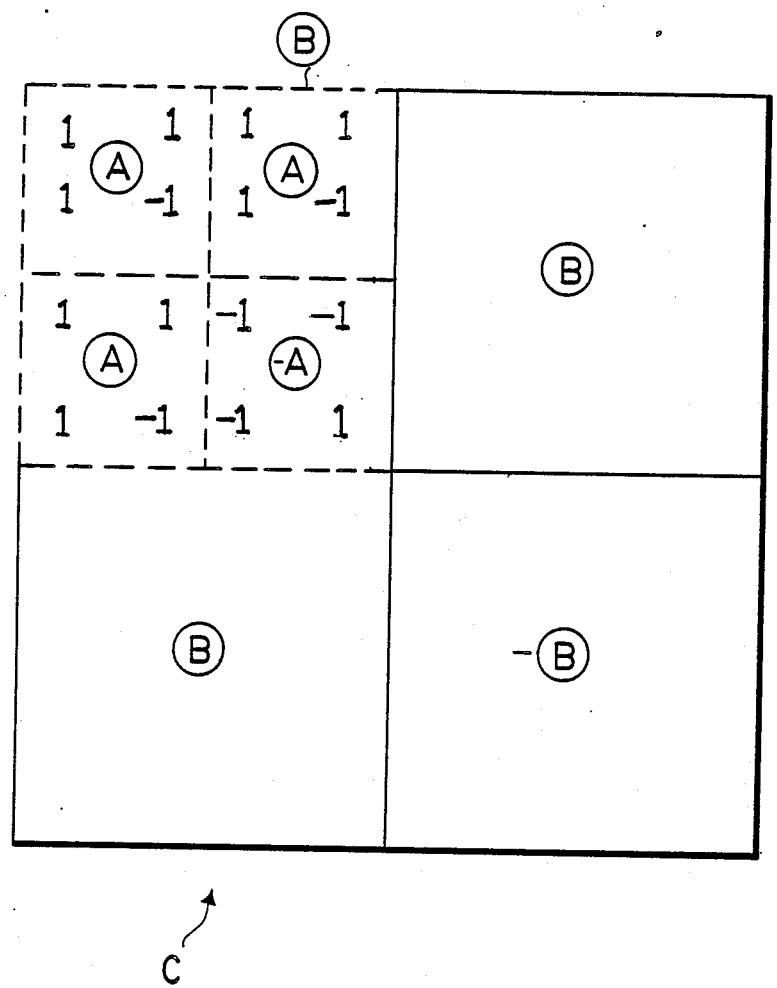
FIG. 4 is a diagram illustrative of the generation of a 128×128 Hadamard matrix.

At encoder 16 the eight bits, representing a binary number 0 to 255 are encoded in accord with one of the rows of a 128×128 Hadamard matrix or the negative of the row. A brief indication of the generation of the Hadamard matrix is given in FIG. 4 which shows the matrix A with the row arrangement $$\begin{matrix} 1 & 1 \\ 1 & -1 \end{matrix}$$

This is a 2×2 Hadamard matrix.

From matrix A the 4×4 matrix B is constructed using a square of A matrices with $-A$ (all signs of the A matrix reversed) in the lower right corner. The 8×8 matrix C is constructed from the B matrix on the form $$\begin{matrix} B & B \\ B & -B \end{matrix}$$

and so on until a 128×128 matrix is formed. This provides 128 rows of coordinates and the remaining 128 rows of coordinates are provided by the negative of each of the rows of the first 128×128 matrix with the signs of all coordinates reversed.

(It may be noted that the 256 rows thus produced are the coordinates of the vertices of a 128 dimensional cross polytope.) To encode the eight bit number into the corresponding row would require a large look up table. The use of a look up table (although within the scope of the invention) is avoided in the preferred embodiment by the computer program set out below.

(Returning to FIG. 4 it will be noted that the same sequence shown may be used to develop a 256×256, 512×512 or higher order Hadamard matrix.)

In addition to the provisions of 128 coordinates, each ±1, the computer program to be set out modifies the coordinates to provide differential encoding and by a series of rotations to improve the spectral characteristics which improves the quality of transmission. Differential encoding assists in avoiding the cumulative results of errors at the receiver as to the sector of the quadrature modulation from the transmitter. The rotations to improve the spectral characteristics tend to improve the suitability of some rows of the Hadamard matrix for transmission over the channel. For example the top row of the matrix will be 128 '1's' and the 129th row will be 128 "−1's". The rotations shown in the program will provide better transmission qualities of these rows and other rows with long sequences of 1s or −1s by (statistically) reducing the length of a series of similar coordinates.

The encode program is as follows:

Eight bits of data are encoded into 128 coordinates to be transmitted in quadrature in 64 bauds.

All coordinates are +1 or −1 and are selected from one of the 128 rows of a 128×128 Hadamard matrix or its negative. These form the vertices of a 128-dimensional cross polytope. The coordinates are further modified to provide differential encoding and by a sequence of rotations to improve the spectral characteristics of the signal.

Let TDAT be the (8 bit) data to be transmitted.

Let TLQ (low order 2 bits) (called bit 0 and bit 1) identify the last quadrant used. Initially zero. Encoding proceeds as follows:

Step 1—Add TDAT to TLQ modulo 3 to differential encode

Step 2—Determine the first two coordinates, C(0) & C(1), as follows:
 If TLQ=0, C(0)=+1 and C(1)=+1
 If TLQ=1, C(0)=−1 and C(1)=+1
 If TLQ=2, C(0)=−1 and C(1)=−1
 If TLQ=3, C(0)=+1 and C(1)=−1

Step 3—Determine two more coordinates as follows:
 If bit 2 of TDAT=0, C(2)=C(0) and C(3)=C(1)
 If bit 2 of TDAT=1, C(2)=−C(0) and C(3)=−C(1)

Step 4—Determine four more coordinates as follows:
 If bit 3 of TDAT=0, C(4) to C(7)=C(0) to C(3)
 If bit 3 of TDAT=1, C(4) to C(7)=−C(0) to −C(3)

Step 5—Determine eight more coordinates as follows:
 If bit 4 of TDAT=0, C(8) to C(15)=C(0) to C(7)
 If bit 4 of TDAT=1, C(8) to C(15)=−C(0) to −C(7)

Step 6—Determine sixteen more coordinates as follows:
 If bit 5 of TDAT=0, C(16) to C(31)=C(0) to C(15)
 If bit 5 of TDAT=1, C(16) to C(31)=−C(0) to −C(15)

Step 7—Determine thirty-two more coordinates as follows:
 If bit 6 of TDAT=0, C(32) to C(63)=C(0) to C(31)
 If bit 6 of TDAT=1, C(32) to C(63)=−C(0) to −C(31)

Step 8—Determine sixty-four more coordinates as follows:
 If bit 7 of TDAT=0, C(64) to C(127)=C(0) to C(63)
 If bit 7 of TDAT=1, C(64) to C(127)=−C(0) to −C(63)

Step 9—Correct the spectrum by rotating each of the 64 bauds (counter-clockwise) by the multiples of 90 degrees given by the sequence: 00010020030110112013021022023031032033111211312212313213322232333

In the program as set out above it will be noted that Step 1 provides the differential encoding. It will also be noted that Step 9 involves the (counter-clockwise) rotations of successive pairs of coordinates through 0, 90, 180 or 270 degrees, that is the two coordinates in a pair, ±1, ±1 are rotated in two dimensions through the number of quadrants recited in Step 9.

The 128 coordinates, incorporating the information of the 8 data bits with differential encoding and rotation are, in a conventional manner, modulated or a carrier, two at a time, over 64 bauds at mixers 48 and 50 for transmission over the channel, including line 36 to demodulator and decoder 24. The 128 bits are considered a frame, to be decoded at demodulator 24.

In demodulator 24 the program is designed to recover the 8 data bits from the 128 coordinates.

Figure 3:
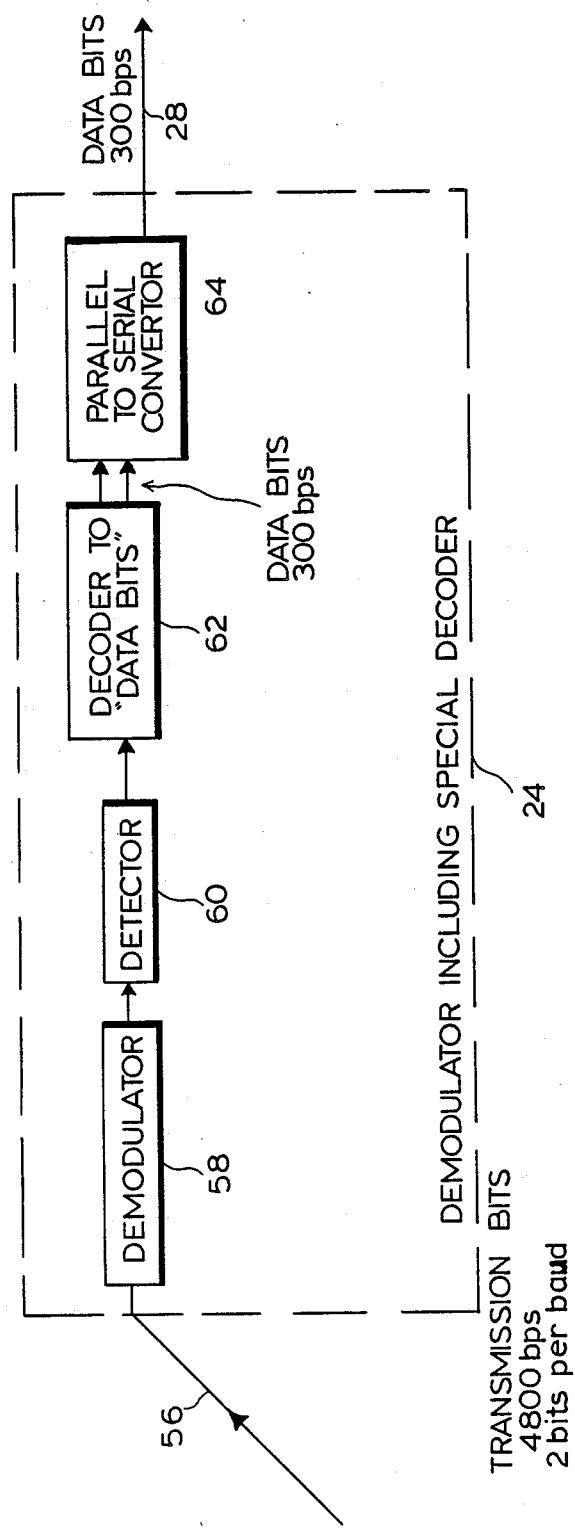
FIG. 3 is a schematic of the demodulator with special decoder (at the opposite end of the channel from the modulator of FIG. 2) for converting sets of 128 transmission bits into 8 data bits.

FIG. 3 gives the general arrangement of the demodulator 24. Line 56 is designated in FIGS. 1 and 3 to correlate the location on the two figures. As FIG. 3 indicates modulated signals incorporating transmission bits received from modulator 16 over the channel are demodulated and detected at demodulator and detector 58 and 60. The detector output is provided to decoder 62 for decoding in accord with the program hereinafter described. The eight data bits provided by decoder 62 are converted to their original serial arrangement at parallel to serial convertor 64 (contributing another eight bit delay) and supplied along line 28 at 300 bps to the large computer or other destination.

The program proceeds as follows:

Let RLQ (low order 2 bits) identify the last quadrant used. Initially zero. Decoding proceeds as follows:

Step 1—Reverse the rotations performed in step 9 of encoding. I.e. Rotate each of the 64 bauds (clockwise) by the multiples of 90 degrees given by the sequence: 00010020030110120130210220230310320331112113122123132133322232333

Step 2—Set i=1

Step 3—Set j=0

Step 4—Set k=j

Step 5—Set C[k]=(C[k]+C[k+i])/2 Set C[k+i]=C[k]−C[k+i]

Step 6—Set k=k+1; if k<j+i return to step 5

Step 7—Set j=j+(i*2); if j<128 return to step 4

Step 8—Set i=i*2; if i<128 return to step 3

Step 9—Identify the coordinate with the largest absolute value. Let C[i] be this coordinate. Set RDAT=i*2

Step 10—If C[i] is negative, complement the two low bits of RDAT.

Step 11—Set temp=RDAT modulo 4

Step 12—Subtract RLQ from the two low bits of RDAT (without borrow into the higher bits). Set RLQ=temp.

In the program Step 1 reverses the rotations made at the encoder for spectral improvement during transmission.

Steps 2-8 perform on the received coordinates what is known either as Fast Walsh Transform or a Fast Hadamard transform on the 128 coordinates. It may be helpful to consider a two dimensional analogy. In two dimensions the four coordinates represented by ±1, ±1 form a square. This square may be rotated 45° in a direction (say clockwise) to produce the four coordinates ±2,0 and 0,±2. After rotation, the location of the '2' coordinate provides one bit of information and its sense the other bit. In the fast transform the 128 coordinates each having the value ±1 are theoretically converted to 127 coordinate having minimal value and one coordinate having a large value 1.

Figure 5:
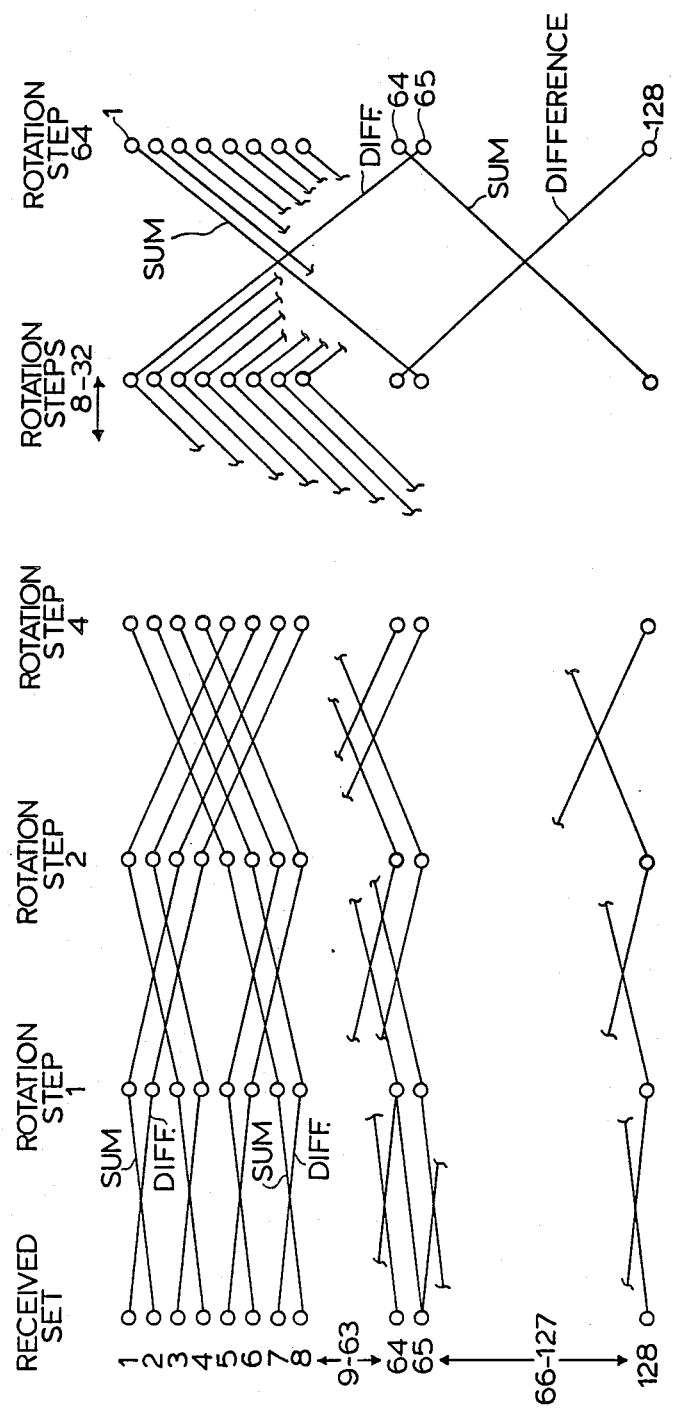
FIG. 5 is a diagram illustrative of the calculations of rotations of Hadamard row coordinates.

Steps 2-8 and the Fast Hadamard Transform may be somewhat illuminated by FIG. 5.

The left hand column of FIG. 5 represents the 128 received coordinates. Consecutive pairs of coordinates are added and subtracted in each case with a division by 2, to provide new sum and difference coordinates. (Addition being represented by an upwardly sloping line and subtraction by a downward), to produce the 128 coordinates of rotation Step 1 (the 1 indicating the vertical step) between coordinates. Rotation Step 2 is the halved sum and difference of *new* coordinates stepped by 2 rows 1 and 3, 2 and 4 etc.

The rotation is continued and completed over rotation Steps 4-64, each step being twice the previous and the step number representing the row differential between pairs of coordinates which are added and subtracted (with optional division of 2 to obtain the new coordinates).

The result of such rotation is to produce one coordinate of approximtely ±1 and the rest of approximately 0 the approximation arising from the distortions and noise during transition. If the halving is not performed, or if the scale of the coordinates is changed for any other reason, the results will still be that one coordinate is larger than the rest. The location of the largest coordinate gives 7 bits of information as to the data bits and the sense of the coordinate gives the other. Due to the encoding and decoding algorithm here used the place of the largest coordinate gives the high order seven data bits directly and the sense of the lowest bit. If an algorithm which did not give the bits directly were used, a look up table would be required.

In practice due to noise, transmission, distortions etc. affect the values of the received transformed coordinates but the result of the transformation will still be that the coordinate of largest absolute value will identify 7 bits of information by its location in the 128 coordinate places (Step 9 of program) and one bit of information by its sense (Step 10 of program). It is a useful characteristic of the encoding and decoding program used that the place of the largest coordinate gives directly the value of the high order 7 bits after multiplication of the vertical place number (i) by 2 (Step 9 of the program).

Step 10 of the program results from the fact that if the largest coordinate is negative the two low bits of RDAT (after the multiplication by 2) are 1,0 or 0,0. The higher order of the two low bits must be complemented because of characteristics of the differential encoding method used. The lower order bit which will be 0 after multiplication by 2 is converted to 1 to indicate the coordinate was negative. Hence Step 10.

As previously noted the data bits provided by decoder 62 under the program justed provided are converted to serial order at serial to binary convertor 64 and provided at its output as the same serial bits as supplied along line 12.

The process as described of encoding, modulating, transmitting, demodulating and decoding proceeds sequentially with the blocks of eight bits arriving at encoder 16. Since both modems are full duplex the transmissions described proceed simultaneously with the transmissions in the appropriate direction from the large computer through modulator 26 over the channel to demodulator 18 which opposite direction transmissions may be performed by conventional means.

It will be noted that the algorithm used in the encoding step to obtain the 128 coordinates could be replaced by a different algorithm or a look up table. However a look up table would require larger memory capacity, increasing the cost of the device. If a different encoding algorithm is used, a look up table might be required at the decoder. Similarly the decoding algorithm may be replaced with a look up table or another algorithm. The look up table will increase the cost of the device just as in the encoder.

An example of the advantageous design which may be achieved with the preferred embodiment is set out below. It is noted that the coding gain due to the use of the preferred encoding method at encoder 16 is 20 dB. (It is assumed that the line loss from modem to modem is 30 dB, which is an average figure, and transmission both ways are at 2400 baud). This coding gain of approximately 20 db could be used to reduce the echo cancellation requirements of modem 22 by this amount (i.e. from 46 db to 26 db). However, by reducing the transmission level of modem 10 by half this amount (i.e. 10 db), this coding gain may be used to reduce the cancellation requirements of both modems by 10 db (each to 36 db). Thus equalizing the computational complexity as indicated in the following table.

|  | Modem 22 | Modem 10 |
|---|---|---|
| Transmission data ratio | 9600 bps | 300 bps (coded) |
| Reception data rate (data bits) | 300 bps* | 9600 bps |
| Transmission level | −10 dbm** | −20 dbm** |
| Reception level | −50 dbm** | −40 dbm** |
| Reception signal/noise requirement | −4 db | 16 db |
| Cancellation requirement | 36 db | 36 db |

*'transmission bit' data rate 4800 bps
**dbm - decibels in relation to 1 miliwatt In the preferred embodiment given the distribution of 8 coordinates over 128 coordinates is suitable for the 300 bps it will be noted that other distributions are available.

Other distributions may be used. For example page 247 of the book Error Correcting Codes, W. Wesley Peterson and E. J. Hocquenghem Code shows a number of Binary narrow sense codes indexed for numbers n which are $2^k - 1$. One bit (being the addition of a parity bit) may be considered as added so that for our purpose n=7, 15, 31 and so on, may be considered as n=8, 16, 32 and represents the number of slow rate transmission bits into which the data bits, represented by k must be encoded. ⅛ bit per baud is equal to 1/16 bits per dimension with quarature modulation of 0.0625 bits per dimension. Thus, the encoding and decoding at the 300 bps source might be in accord with the first code in the left hand column of page 275 where 40 bits are encoded in 512 dimensions that is 0.078125 bits per dimension. Since only 0.0652 bits per dimension are required it will not be necessary to use all 1024 points in the 512 dimensions to carry ⅛ of a data bit per baud. The points dropped from the 1024 points will be selected having regard to symmetry to improve the quality of transmission. Data bits would, of course have to be encoded in blocks of 40. A 512×512 Hadamard matrix would be used (which signals at 2 bits per baud) include signalling the transmission bits at 4 bits per baud.

In general the transofrmation mode or algorithm from data bits to transmission bits will depend on the slow data rate (here 300 bps). For a different slow date rate a different transformation would be used. The slow bit rate which is a fraction of the data rate must be converted, in each case, into a transmission bit rate which provides an integral number of bits per baud.

I claim:

1. In a communication system:
a pair of full duplex modems connected by a channel, each modem being designed to transmit to the other at the same predetermined baud rate,
one of said modems being designed to receive a first series of data bits at a predetermined first rate for transmission over said channel and to transmit said received bits as first transmission bits over said channel as an integral number of first transmission bits per baud,
the other of said modems being designed to receive a second series of data bits at a data bit rate slower than the predetermined baud rate, for transmission over said channel,
means forming part of said other modem for sequentially encoding blocks of said second series of data bits in blocks into a larger number of second transmission bits for transmission over said channel at an integral number of second transmission bits per baud
means forming part of said one modem for decoding said second transmission bits into said second series of data bits.

2. A full duplex modem
being connected to a channel to receive and transmit thereon at the same predetermined baud rate,
means in said modem for receiving data bits for transmission over said channel, at a predetermined data bit rate less than said predetermined baud rate and for converting said data bits in blocks into a larger number of transmission bits, to provide an integral number of transmission bits per baud for transmission along said channel.

3. In a communications system as claimed in claim 1 where the baud rate is 2400, the slower bit rate is 300 bps and each block of 8 said data bits is encoded into 128 transmission bits.

4. In a communications system as claimed in claim 2 where the baud rate is 2400, the data bit rate is 300 bps and the data bits are encoded in blocks of 8 into 128 transmission bits.

5. In a communications system as claimed in claim 3 wherein, in said sequentially encoding means said eight bits per block are used to uniquely select coordinates comprising a row of a 128×128 Hadamand matrix or its negative and said transmission bits are based on said coordinates.

6. In a communications system as claimed in claim 4 wherein, in said receiving and converting means, said eight bits per block are used to uniquely select coordinates which are a row of a 128×128 Hadamard matrix or its negative and said transmission bits are based on said coordinates.

7. In a communications system as claimed in claim 1 wherein said means for encoding said blocks of data bits provides from said blocks said second transmission bits determined in accord with the coordinates selected from rows of a Hadamard matrix or its negative.

8. In a full duplex modem as claimed in claim 1 wherein said encoding means provides from said blocks transmission bits determined in accord with coordinates selected from the rows of a Hadmand matrix or its negative.

9. A full duplex modem designed for reception and transmission over a channel at a predetermined baud rate, designed to receive from said channel first transmission bits at a rate which is an integral number of bits per baud, and having means designed to be supplied with data bits at a rate which is a fractional number of bits per baud, means for converting said bits in blocks into a larger number of second transmission bits with values having a unique relationship to a block of said bits at an integral number per baud and means for transmitting said second bits on said channel.

10. In combination with the full duplex modem of claim 9, a second full duplex modem connected to said first-mentioned modem over said channel; said second modem being designed for reception and transmission over said channel at said predetermined baud rate,
means in said second modem for decoding said second transmission bits into the said blocks of data bits.

11. A full duplex modem, as claimed in claim 9 wherein said predetermined baud rate is 2400 and said data bit rate is 300 bps, said second transmission bit rate is 4800 bps.

12. In combination with the full duplex modem of claim 10, a second full duplex modem, connected over said channel to said first mentioned modem, said second modem being designed for reception and transmission over said channel at 2400 baud,
means in said second modem for decoding said second transmission bits into said blocks of data bits.

13. A full duplex modem as claimed in claim 9 wherein said encoding is determined by rows selected from a Hadamard matrix or its negative.

14. A full duplex modem as claimed in claim 11 wherein said encoding is determined by rows selected from a 128×128 Hadamard matrix or its negative.

15. In a communications system as claimed in claim 5 wherein said encoding means includes means for modifying said coordinates to provide differential encoding.

16. In a communications system as claimed in claim 5 wherein said encoding means includes means for modifying said coordinates by rotations.

17. In a communications system as claimed in claim 8 wherein said encoding means includes means for modifying said coordinates to provide differential encoding.

18. In a communications system as claimed in claim 8 wherein said encoding means includes means for modifying said coordinates by rotations.

* * * * *